(12) United States Patent
Hu et al.

(10) Patent No.: US 11,682,065 B2
(45) Date of Patent: Jun. 20, 2023

(54) SYSTEMS AND METHODS FOR REDUCING SERVICE ERRORS FOR RESTAURANTS

(71) Applicant: FUJIFILM Business Innovation Corp., Tokyo (JP)

(72) Inventors: Hao Hu, Sunnyvale, CA (US); Yanxia Zhang, Cupertino, CA (US); Qiong Liu, Cupertino, CA (US); Lynn Donelle Wilcox, Redwood City, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 285 days.

(21) Appl. No.: 16/903,115

(22) Filed: Jun. 16, 2020

(65) Prior Publication Data
US 2021/0390635 A1   Dec. 16, 2021

(51) Int. Cl.
*G06Q 30/06* (2023.01)
*G06Q 30/0601* (2023.01)
*G06Q 50/12* (2012.01)
*G06F 16/2455* (2019.01)
*G06Q 10/083* (2023.01)
(Continued)

(52) U.S. Cl.
CPC ....... *G06Q 30/0635* (2013.01); *G05B 13/027* (2013.01); *G06F 3/0482* (2013.01); *G06F 16/24558* (2019.01); *G06F 18/22* (2023.01); *G06N 3/045* (2023.01); *G06N 3/08* (2013.01); *G06Q 10/083* (2013.01); *G06Q 50/12* (2013.01); *G06V 10/454* (2022.01); *G06V 10/82* (2022.01);
(Continued)

(58) Field of Classification Search
CPC .. G06Q 50/12; G06Q 10/083; G06Q 30/0635; G05B 13/027; G06F 3/0482; G06F 16/24558; G06F 18/22; G06K 9/6201; G06N 3/0454; G06N 3/08; G06N 3/045; G06V 40/10; G06V 10/454; G06V 10/82; G06V 20/52; G06V 40/173
See application file for complete search history.

(56) References Cited

U.S. PATENT DOCUMENTS 9,980,100 B1 *   5/2018  Charlton ............... G06V 20/38
2003/0213840 A1 * 11/2003  Livingston ............ G08B 5/222
                                                                    235/375
(Continued)

OTHER PUBLICATIONS

Ba, J. L., et al., Layer Normalization, Jul. 21, 2016, arXiv:1607.06450, 14 pgs.
(Continued)

*Primary Examiner* — Tuyen K Vo
(74) *Attorney, Agent, or Firm* — Procopio, Cory, Hargreaves & Savitch LLP (57) ABSTRACT

A computer-implemented method, comprising receiving an order associated with a user, and capturing information associated with a physical attribute of the user; for the order being completed, performing a matching operation on the physical attribute of the user and information associated with a region of the user that includes the physical attribute of the user and respective physical attributes of other users, to determine a closest match; and generating an output that identifies the user associated with the closest match in the information associated with the region of the user, and providing the output to a server to deliver the order to the user.

20 Claims, 9 Drawing Sheets

(51) Int. Cl.
G06N 3/08 (2023.01)
G06F 3/0482 (2013.01)
G05B 13/02 (2006.01)
G06V 40/10 (2022.01)
G06F 18/22 (2023.01)
G06N 3/045 (2023.01)
G06V 10/82 (2022.01)
G06V 10/44 (2022.01)
G06V 20/52 (2022.01)
G06V 40/16 (2022.01)

(52) U.S. Cl.
CPC .............. *G06V 20/52* (2022.01); *G06V 40/10* (2022.01); *G06V 40/173* (2022.01)

(56) References Cited

U.S. PATENT DOCUMENTS

| | | | | |
|---|---|---|---|---|
| 2004/0087367 | A1* | 5/2004 | Hendrickson | G06F 9/5038 463/42 |
| 2005/0049940 | A1* | 3/2005 | Tengler | G06Q 10/087 705/21 |
| 2014/0214465 | A1* | 7/2014 | L'Heureux | G06Q 10/08 705/7.13 |
| 2014/0214561 | A1* | 7/2014 | Butler | G06Q 50/12 705/15 |
| 2015/0095168 | A1* | 4/2015 | Zises | G06Q 30/0623 705/15 |
| 2021/0027448 | A1* | 1/2021 | Cohen | G06T 7/90 |

OTHER PUBLICATIONS

Bertinetto, L., et al., Fully-Convolutional Siamese Networks for Object Tracking, European Conference on Computer Vision, 2016, pp. 850-865.

Chen, W., et al., Beyond Triplet Loss: A Deep Quadruplet Network for Person Re-Identification, Proceedings of the IEEE Conference on Computer Vision and Pattern Recognition, 2017, pp. 403-412.

Graves, A., et al., Speech Recognition with Deep Recurrent Neural Networks, 2013 IEEE International Conference on Acoustics, Speech and Signal Processing, 2013, pp. 6645-6649.

He, K., et al., Deep Residual Learning for Image Recognition, Proceedings of the IEEE Conference on Computer Vision and Pattern Recognition, 2016, pp. 770-778.

Hermans, A., et al., In Defense of the Triplet Loss for Person Re-Identification, Nov. 21, 2017, arXiv:1703.07737, 17 pgs.

Hoffer, E., et al., Deep Metric Learning Using Triplet Network, International Workshop on Similarity-Based Pattern Recognition, 2015, pp. 84-92.

Ioffe, S., et al., Batch Normalization: Accelerating Deep Network Training by Reducing Internal Covariate Shift, Mar. 2, 2015, arXiv:1502.03167, 11 pgs.

Jia, J., et al., Frustratingly Easy Person Re-Identification: Generalizing Person Re-ID in Practice, Jul. 22, 2019, arXiv:1905.03422, 14 pgs.

Koch, G., Siamese Neural Networks for One-Shot Image Recognition, Thesis for Masters Degree of Science, Graduate Department of Computer Science, University of Toronto, 2015, 30 pgs.

Luo, H., et al., Bag of Tricks and a Strong Baseline for Deep Person Re-Identification, Proceedings of the IEEE Conference on Computer Vision and Pattern Recognition Workshops, 2019, pp. 4321-4329.

Redmon, J., et al., YOLOv3: An Incremental Improvement, Apr. 8, 2018, arXiv:1804.02767, 6 pgs.

Schroff, F., et al., FaceNet: A Unified Embedding for Face Recognition and Clustering, Proceedings of the IEEE Conference on Computer Vision and Pattern Recognition, 2015, pp. 815-823.

Weinberger, K. Q., et al., Distance Metric Learning for Large Margin Nearest Neighbor Classification, Journal of Machine Learning Research, 10, 2009, pp. 207-244.

Zeghidour, N., et al., Joint Learning of Speaker and Phonetic Similarities with Siamese Networks, Interspeech, 2016, pp. 1295-1299.

Zheng, L., et al., Scalable Person Re-Identification: A Benchmark, Proceedings of the IEEE International Conference on Computer Vision, 2015, pp. 1116-1124.

\* cited by examiner

SYSTEMS AND METHODS FOR REDUCING SERVICE ERRORS FOR RESTAURANTS

BACKGROUND

Field

Aspects of the example implementations relate to methods, systems and user experiences associated with reduction of service errors, such as in restaurants, and more specifically, to match an image of a user who orders a dish with an image of the area, such that the server is provided with a support system to associate and deliver the completed order to the user.

Related Art

In the related art, serving wrong dishes to customers is a significant problem for service quality in the restaurant business. According to related art approaches, a waiter/waitress needs to play multiple roles (e.g. ordering, serving, cleaning, etc.) and be in charge of multiple tables simultaneously, including to memorize the appearances of the customers who place the orders, some of whom switch positions or tables without informing the server, and some of whom may appear similar to one another. The waiter/waitress may be overrun by too many diners, such that they serve dishes ordered by someone else. A recent study indicates that such errors cause about $9,000 per month of financial losses for a middle sized restaurant.

In addition to the financial losses, there may be other losses. For example, customers must wait for a longer time until waiters/waitresses determine the correct serving objects. This delay can lead to significantly higher risk of poor customer satisfaction and negative reviews (e.g., on social media), which will further harm revenue of business.

Further, kitchens can be disrupted by serving errors due to a need to re-cook the correct dishes as soon as possible to redeem the situation, introducing extra costs of wasting and increasing the probability of serving congestion.

Related art solutions directed to reducing serving errors can be roughly categorized into traditional approaches and technique-powered approaches.

Traditional related art approaches include hiring more restaurant staff and offering better professional training to make staff more experienced. These solutions are quite straightforward. However, they are not time efficient, and are far more expensive. For instance, business owners must pay extra money for additionally hired waiters/waitresses, who may also make restaurants even more crowded at peak dining time and potentially prolong customers' waiting time. On the other hand, professional training can be a slow process which may take months to complete and may bring extra burden to waiters/waitresses besides their daily duties. More importantly, due to low retention rates of waiter/waitress jobs, professional training could be very inefficient as every new employee has to complete the training before the benefit can be seen.

Related art technique-powered approaches seek assistance of techniques to reduce serving errors. A representative related art example is restaurant point of sale (POS) systems. A related art POS system provides automated services such as menu management, bill splitting and customer feedback analysis, etc. Such functionalities emphasis on improving the customer experiences from aspects like offering convenient dish customization choices, improving the communication between kitchen and customer, and providing more efficient employee management. However, these related art techniques aiming at restaurant business do not consider the problem of serving dishes to wrong customers. Thus, business owners must still only rely on related art traditional approaches to reduce such serving errors.

There is an unmet need in the related art to develop a solution to help a restaurant identify dishes that have been erroneously served.

SUMMARY

According to an aspect of the example implementations, comprising receiving an order associated with a user, and capturing information associated with a physical attribute of the user; for the order being completed, performing a matching operation on the physical attribute of the user and information associated with a region of the user that includes the physical attribute of the user and respective physical attributes of other users, to determine a closest match; and generating an output that identifies the user associated with the closest match in the information associated with the region of the user, and providing the output to a server to deliver the order to the user.

Example implementations may also include a non-transitory computer readable medium having a storage and processor, the processor capable of executing instructions associated with reduction of service errors, such as in restaurants, and more specifically, to match an image of a user who orders a dish with an image of the area, such that the server is provided with a support system to associate and deliver the completed order to the user.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting.

The example implementations are directed to system and methods to reduce errors of serving dishes to wrong customers. More specifically, the example, implementation assists waiters/waitresses to accurately link dishes to the right person to whom the dish should be delivered. During the order period, visual information of each customer is captured via a camera and dishes are associated with each individual.

At the serving stage, all people in the camera view are detected, and the person to be served the dish is selected by matching visual information of detected people with the one acquired during the order. During the process, the waiters/waitresses only needs to perform trivial operations (e.g., switch between ordering/serving stages). Thus, the servers may focus on serving customers without needing to memorize accurate individual orders.

According to the example implementations, the core system has a camera and a customer matching module that is built based on deep neural networks. The customer matching (MC) module is trained offline to correctly identify if the people in the two images are the same. For deployment, each waiter/waitress equips an edge device with the camera, which is connected to the cloud that is hosting the trained MC module.

Figure 1:
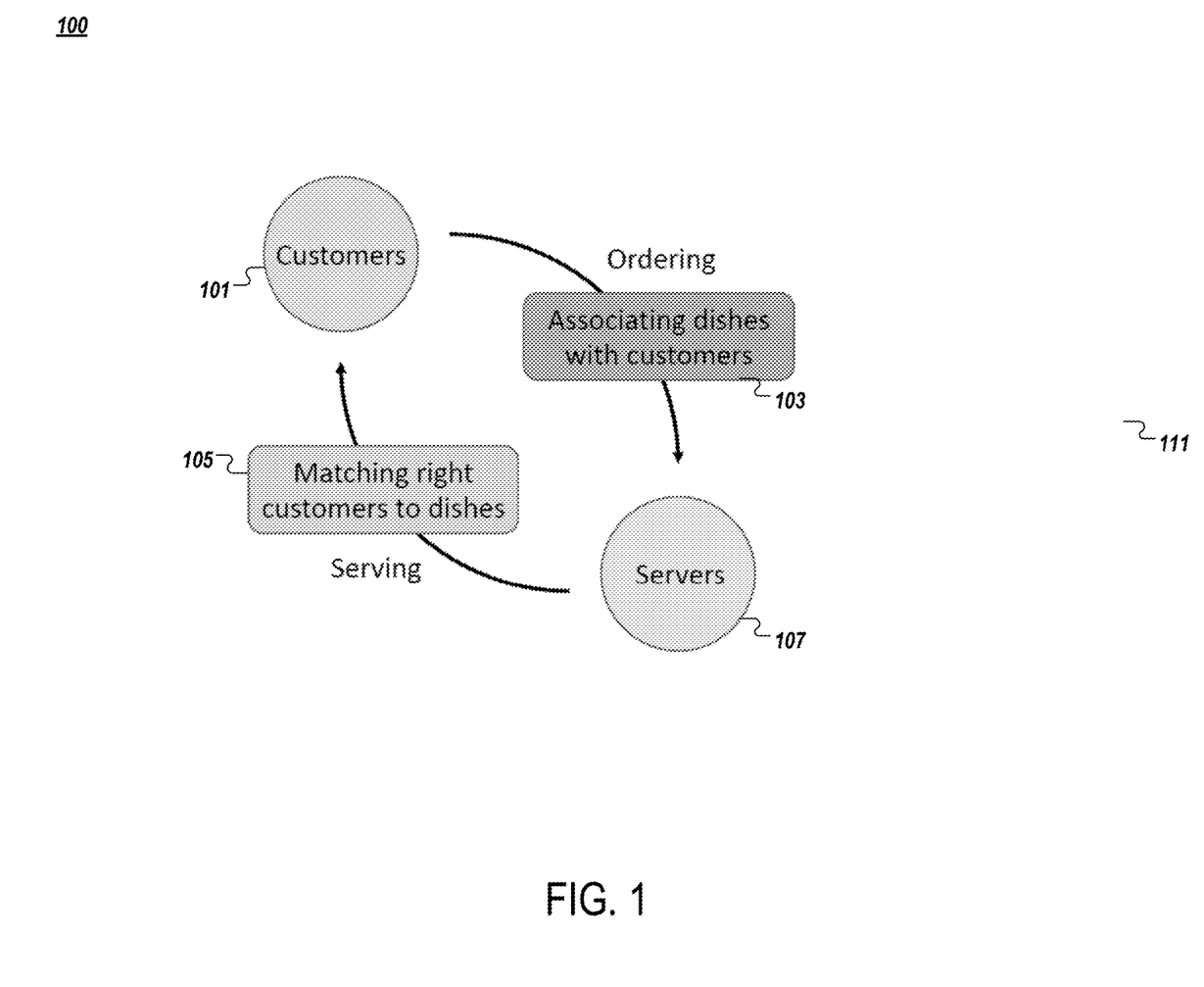
FIG. 1 is a functional block diagram of an example implementation.

FIG. 1 illustrates a functional schematic of the example limitations at 100. More specifically, customers 101 may place an order. At this time, the dishes are associated with the customers at 103. Subsequently, the servers 107 are provided with an order that associates the dish with the customer. Once the dish has been completed, is matched to the right customer 105, during the serving process. Then, the dish is served to the customer 101.

Figure 2:
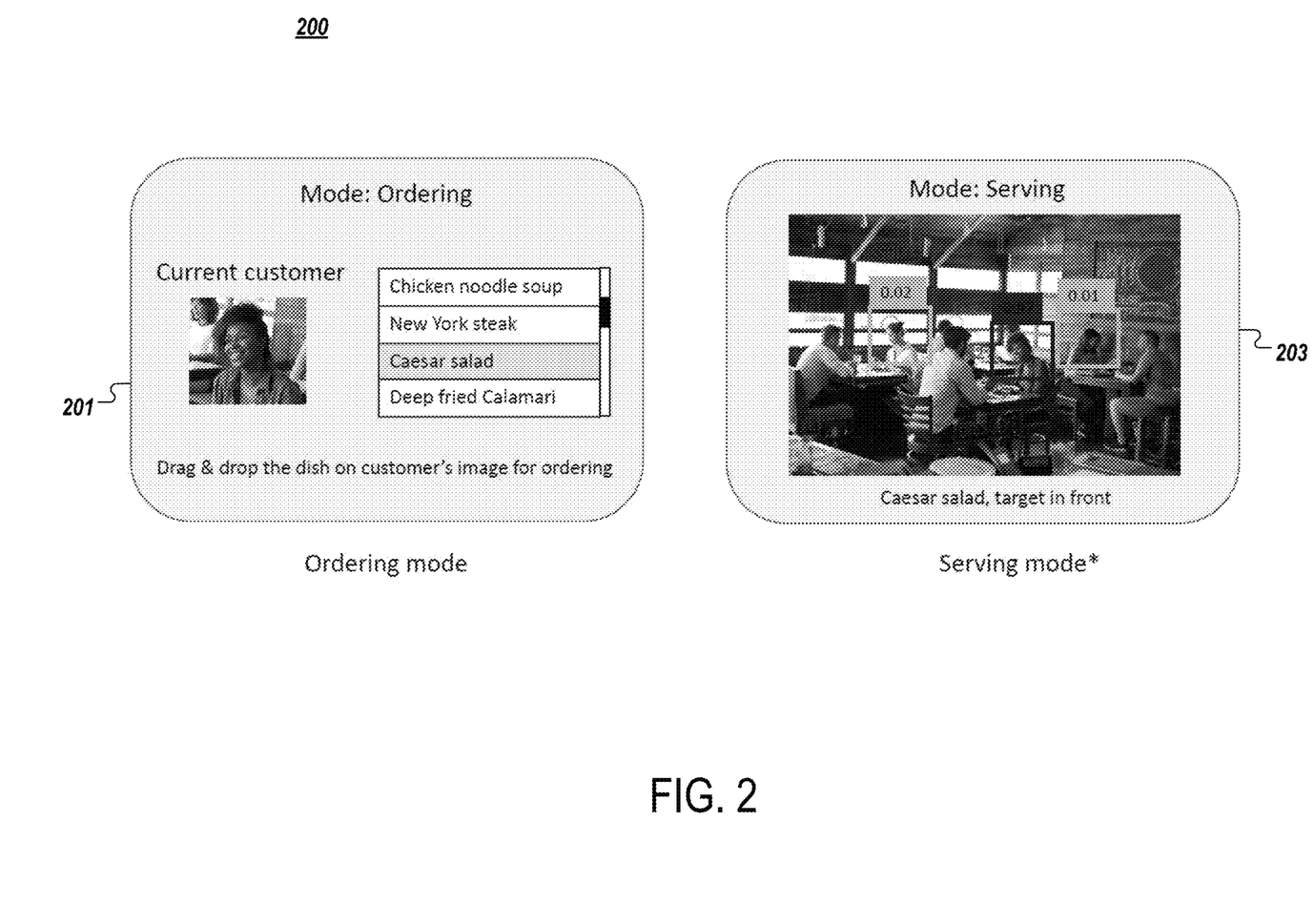
FIG. 2 is an example user experience.

As shown in FIG. 2, an edge device 200 is provided to execute the functional aspects illustrated in FIG. 1. The edge 200 device has two modes, ordering 201 and serving 203. When a device is in ordering mode 201, a camera will capture an image of the customer who is ordering, and automatically link his/her ordered dishes with the captured picture. The picture is then sent back to MC module for feature extraction. For example, as shown at 201, the current customer orders a Caesar salad from the menu (e.g., drag and drop), while the camera captures an image of that customer during the ordering process. As disclosed further below, the user may submit the order without the involvement of the server, to maintain social distance protocols, for example.

After the device is switched to serving mode at 203, its camera will detect all customers that appear in the same screen, and MC module will extract features for each detected customer. Then, for a given dish, its corresponding image feature captured in the ordering mode is compared with features of every newly detected customer. The customer whose feature has the least distance from original picture will be considered as the target, and the waiter/waitress will be informed to serve to the correct person. For example, has shown at 203, once the Caesar salad plate has been completed by the kitchen, the matching operation is performed, and it is determined that the person having an image that matches the customer who ordered the Caesar salad is highlighted in red. Thus, the server does not need to guess the identity of the person who ordered the Caesar salad.

This is particularly useful in larger groups, where the members of the group may decide to switch seats or even switch tables. Because the image of the customer is associated with the order at the initial point of ordering, that relationship is preserved during the serving mode.

While the foregoing example implementation illustrates a visual server guidance, the example implementations are not limited thereto. For example but not by way of limitation, instead of providing a visual indicator, the guidance may also be provided by audio speaker, vibration or other mode, alone or in combination with the usual indicator. Thus, the server in the restaurant is aided in providing the order to the correct customer, and need not guess whether the customer-dish combination is correct.

Figure 3:
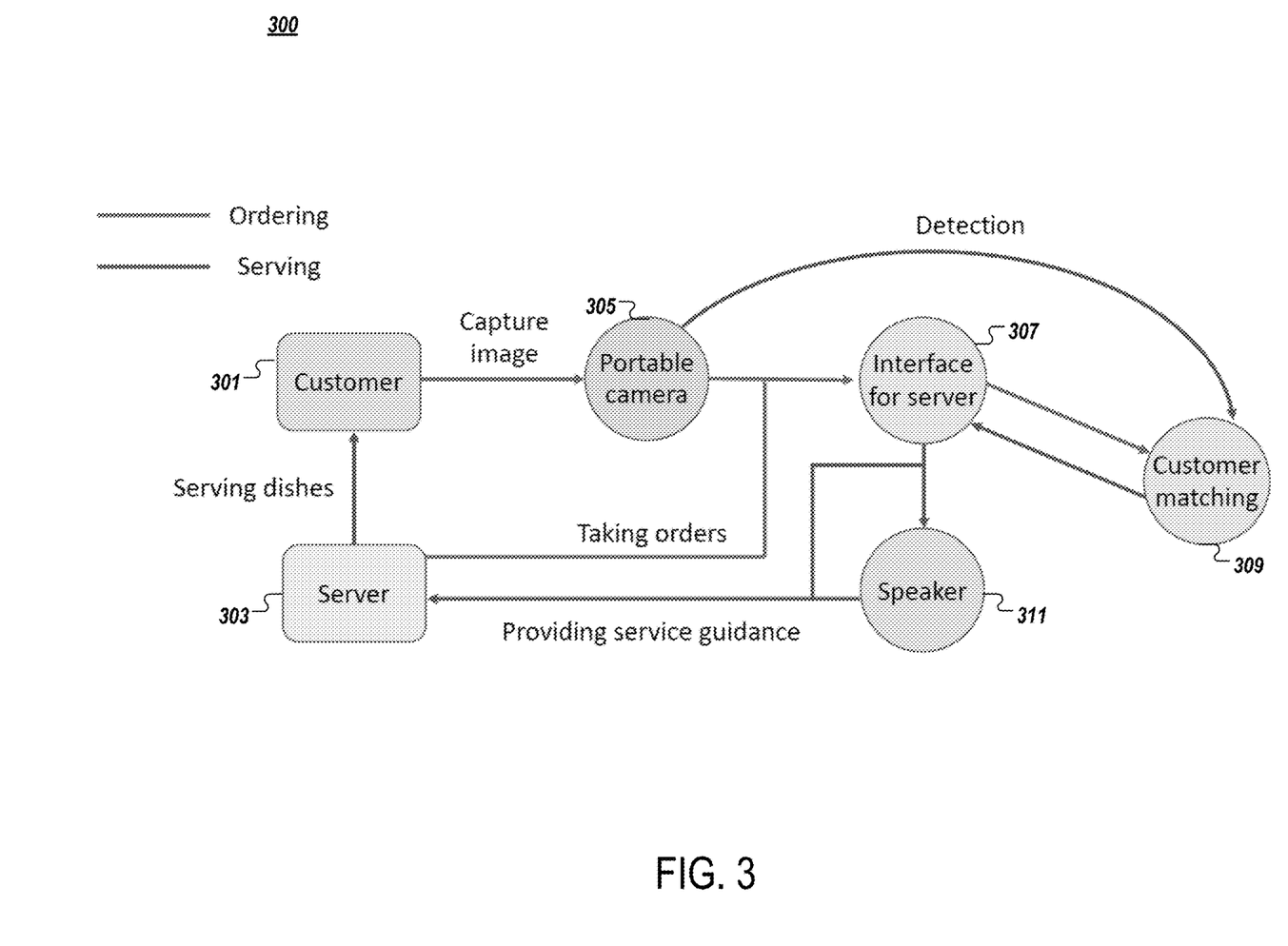
FIG. 3 is a functional block diagram of an example implementation associated with ordering and serving flows.

FIG. 3 illustrates a functional diagram of the example implementations. The flow will be discussed in sequential order, starting with the ordering phase and then moving to the serving phase.

A customer 301 may arrive, and be provided with a table and seat of their choice. Once the customer has been seated, and image of the customer is captured by a portable camera 305. The portable camera 305 may optionally be positioned in a manner that permits easy capturing of the image of the customer 301. For example but not by way of limitation, the portable camera 305 may be positioned above the customers in an array along the ceiling, on the table itself, on a point of service (POS) menu, at a corner of the room, or any other location as would permit the capturing of the image of the customer 301.

The captured image of the customer 301 by the portable camera 305 is provided to a customer matching module 309. The timing of the capture of the image may occur simultaneous with, just before or just after the ordering of dish by the customer 301. If the customer orders directly from a POS device without involving a server, or if the server takes the order, and 307, the order is entered via an interface. That order is also input into the customer matching module 309, along with the photo of the customer. The order is also provided to a server 303.

After some time, the order is prepared, and becomes ready to be served. At that point, the waiter is by that the dish is ready to be served. At this point, the customer matching module 309 requests an image capture of the room from the portable camera 305, and perform a matching function. More specifically, matching function is intended to match the originally captured image of the customer that was provided the order in the ordering phase, with the closest matching image of a customer sitting in the room. That match is provided to the interface 307, such that the server 303 can use that interface to be guided as to where the dish should be delivered. Optionally, a speaker 311 provided direct the server 303. Then, the server 303 serves the dish to the customer 301.

The example implementations include, but are not limited to, input/output devices and the MC module. Further details of these features of the example implementations are disclosed as follows.

For the input/output devices, a camera may capture visual information of customers as input. This camera could be an integrated part of other edge devices such as POS system terminals. The choices for output devices may be flexible. If a waiter/waitress prefers visual feedback, he/she can use the screen of a POS system terminal to target the customer, or he/she can have a POS system terminals with a speaker/headset, and turn on it for auditory instructions when serving dishes.

As shown in Figure in element 203 of FIG. 2 and as disclosed above, based on preferences of different servers, either the target customer will be highlighted on the screen of POS, or waiters/waitresses are given auditory guidance (e.g., suggestive directional information to specify "in front of you", "right/left hand side of you", etc.) to associate the order with the correct customer. The input/output devices may be networked, such as being connected to internet, for transmitting/receiving information to/from MC module.

With respect to the customer matching aspects of the example implementations, a cloud-based service may be provided that determines and returns the "most similar person" image from all detected people for a query image. For example, but not by way of limitation, convolutional neural networks (CNNs) may be used. In one example implementation, the CNN includes feature extractors to process all input images into feature vectors.

Figure 4:
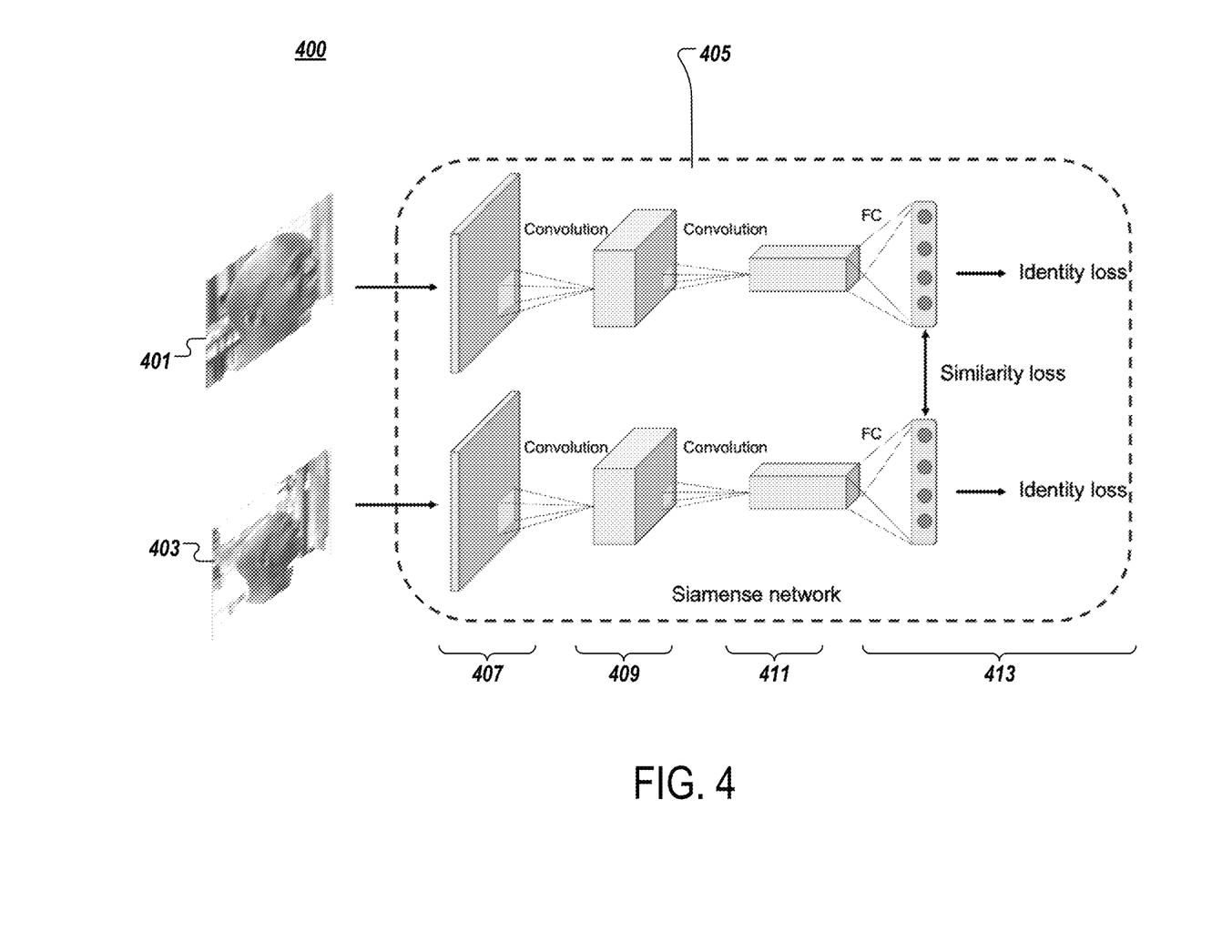
FIG. 4 is an example implementation illustrating a schematic of neural network.

FIG. 4 illustrates the customer matching module 400 according to an example implementation. An image 401 taken at ordering stage is the query image. When a dish is being served, the previously captured query image 401, along with images 403 of all detected people, are extracted into feature vectors first. Then, metrics between feature vectors of query image and detected images are computed and ranked in a descending order. The detected image that has highest metric score is considered as the target customer that dish should be served to. This is accomplished in the CNN 405, for example. Further, the CNN 405 may be a Siamese network including convolutions 407, 409, a fully connected layer 411, and output classification or prediction of matching 413. Two stream processes are provided, and an identity loss and similar loss are determined.

Further supportive functionalities may be combined with the customer matching module 400. For example, but not by way of limitation, a detector (e.g., YOLOv3) may be used for detecting all people on the camera screen before they are sent to perform the matching of the query image. Further, speech recognition may be used to activate the matching process if a waiter/waitress's hand is unavailable due to occupation of dishes. For example but not by way of limitation, the waiter/waitress may instruct the customer matching module 400 to perform the match once the order is ready to serve. Optionally, the audio feed may be used to input speech recognition and matching, to support the image matching.

The example implementations use a Siamese network as the training paradigm, which is a general framework for metric learning. The Siamese network of the CNN 405 aims to minimize the distance between feature vectors that belong to a same person, and maximize the distance between feature vectors that belong to different people. It requires a pair of images as input: "positive pair" means both images are related to the same person; and "negative pair" means one image portrait different person from another.

The training objective is minimizing similarity loss at 413, which encourages networks to reduce the margin for positive pairs and increase the margin for negative pairs. Optionally, the triplet loss is used as the optimization objective. The triplet loss $L_{tri}$ can be formulated as $$L_{tri} = \sum_{i=1}^{N} [\|f_i^a - f_i^p\| - \|f_i^a - f_i^n\| + a]_+ \quad (1)$$

where $f_i^a$ is the feature of anchor image, and $f_i^p$, $f_i^n$ are features of positive and negative paired images to the anchor, respectively. N is the number of selected anchor images. α is the margin controlling the minimal measurement on if features are sufficiently separated.

Optionally, ID loss at 413 may be included in the Siamese networks to improve the performance. Thus, training the Siamese networks may be considered a multi-task learning problem. Unlike similarity loss that requires a pair of images, ID loss only needs one image as the input, and optimizes a single network stream. The objective is to decide the correct identity for the person in input image. In practice, cross-entropy loss $L_{ID}$ is used as the ID loss, which can be formulated as $$L_{ID} = -\sum_{i=1}^{M} (y_i \log(\text{softmax}(f_i))) \quad (2)$$

where yi is the ground truth ID for feature $f_i$ and M is the number of images with ID labels. During the training process, both $L_{tri}$ and $L_{ID}$ are combined as a unified loss function L and jointly trained as following $$L = L_{tri} + \beta L_{ID} \quad (3)$$

where β is a hyper-parameter to controls the impacts of $L_{ID}$ in unified loss function.

In addition to training objectives, a new architectural approach is provided to make customer matching more accurate. ID loss and similarity loss may not be highly compatible to a shared metric space. For example, feature points may be more separable for cosine distance than euclidean distance using ID loss, as opposite to similarity loss where euclidean distance may be easier to converge.

According to the example implementation, different feature spaces are generated for each loss function during training, and the spaces are combined into a unified one during testing. For example, Batch Normalization (BN) and Layer Normalization (LN) may be used to develop distinct feature spaces for ID loss and similarity loss, respectively. For any feature f, Both normalization has the form such as $$f_{B,L} = \gamma_{B,L} \frac{f - \mu_{B,L}}{\sqrt{\sigma_{B,L}^2 + \varepsilon}} + \eta_{B,L} \quad (4)$$

where $\mu_{B;L}$ are batch and layer means, and $\sigma_{B;L}$ are batch and layer variance for BN and LN, respectively. $\gamma_{B;L}$ and $\eta_{B;L}$ are affine transformation weights of corresponding normalization.

During training, feature f in equations 1 and 2 are replaced by $f_B$ and $f_L$, respectively. In such cases $f_B$ only receive gradients from ID loss and $f_L$ for similarity loss. To combine them together attention weights $a_{B;L}$ are calculated for both normalization as:

$$a_i = \frac{K(f, f_i)}{\sum_{j \in N} K(f, f_j)}, i, j \in N = \{B, L\} \quad (5)$$

where K(•;•) is a kernel function to produce attention scores based on f and $f_{B;L}$. The parameters can be jointly trained with Siamese networks.

After training, normalized features $f_{B;L}$ can be fused with attention scores to generate the final feature vector $\tilde{f}$ as $$\tilde{f} = a_B f_B + a_L f_L \quad (6)$$

Figure 5:
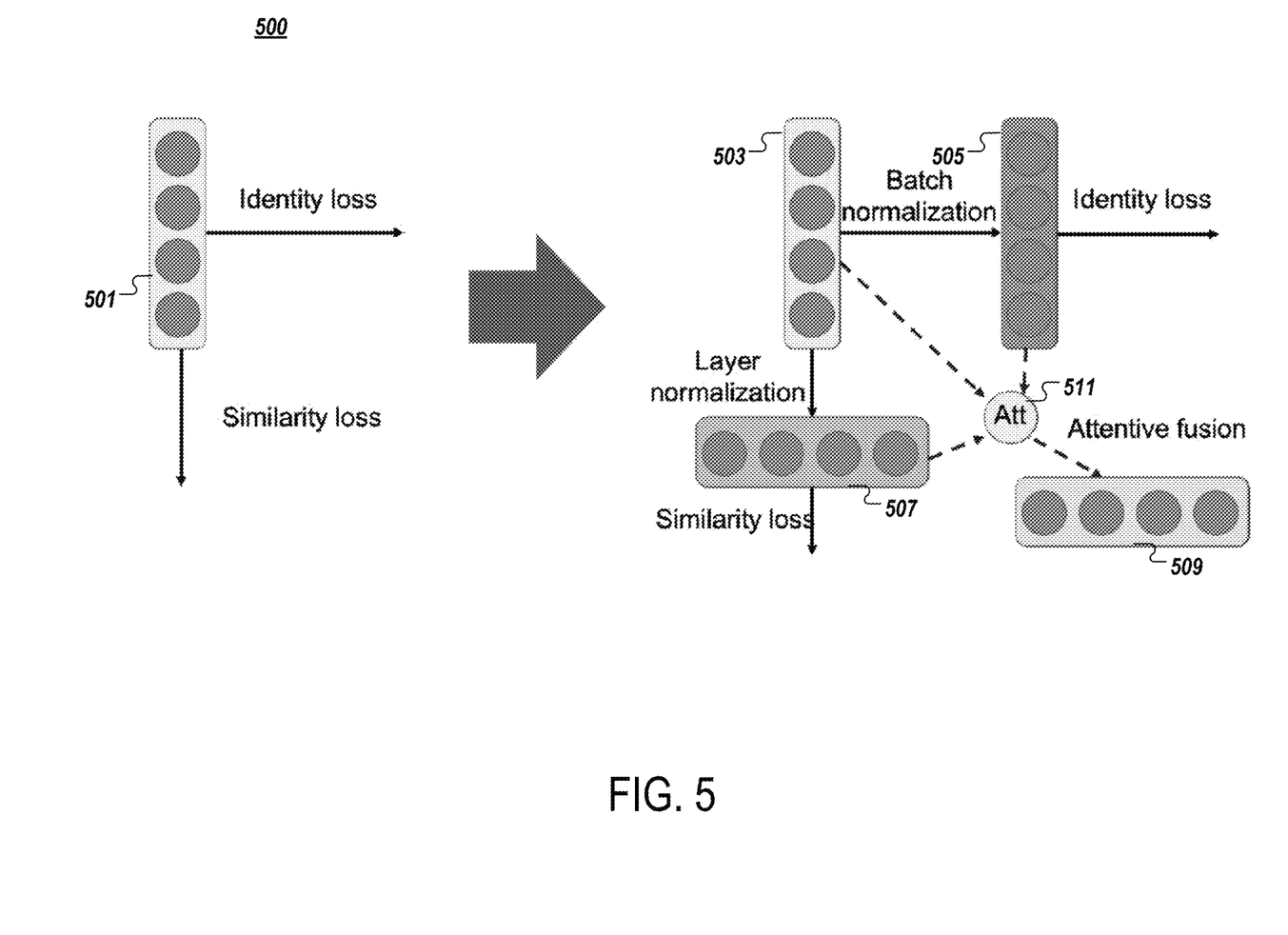
FIG. 5 is an example implementation illustrating a schematic of neural network.

FIG. 3 provides a visualized comparison 500 between a feature space 501 of a Siamese network and an attentive fused space 503-511 according to the example implementations. The feature space 503 is integrated with spaces for which batch normalization 505, similarity loss 507 and attentive fusion 509 have been performed, by a fusing module 511. Accordingly different signals are provided from different inputs.

While related art POS systems for restaurants focus on providing automated solutions to handle problems like menu management, bill splitting and customer feedback analysis, etc., those features directly target customers to improve their dining experiences. However, the present example implementation is distinguishable from those related art POS system approaches, in that the dining experience in enhanced by supporting the waiters/waitresses to reduce serving errors, such that they can be better engaged in serving their customers. Accordingly, the present example implementations may be integrated into a POS system.

The present example implementations provide for person re-identification techniques, optionally on the Siamese networks. As compared with the related art, the present example implementation focuses on sharing metric spaces with different training objectives. Further, the present example implementations are also directed to providing different normalized spaces for corresponding losses, and also combining them in an attentive manner during testing time.

Figure 6A:
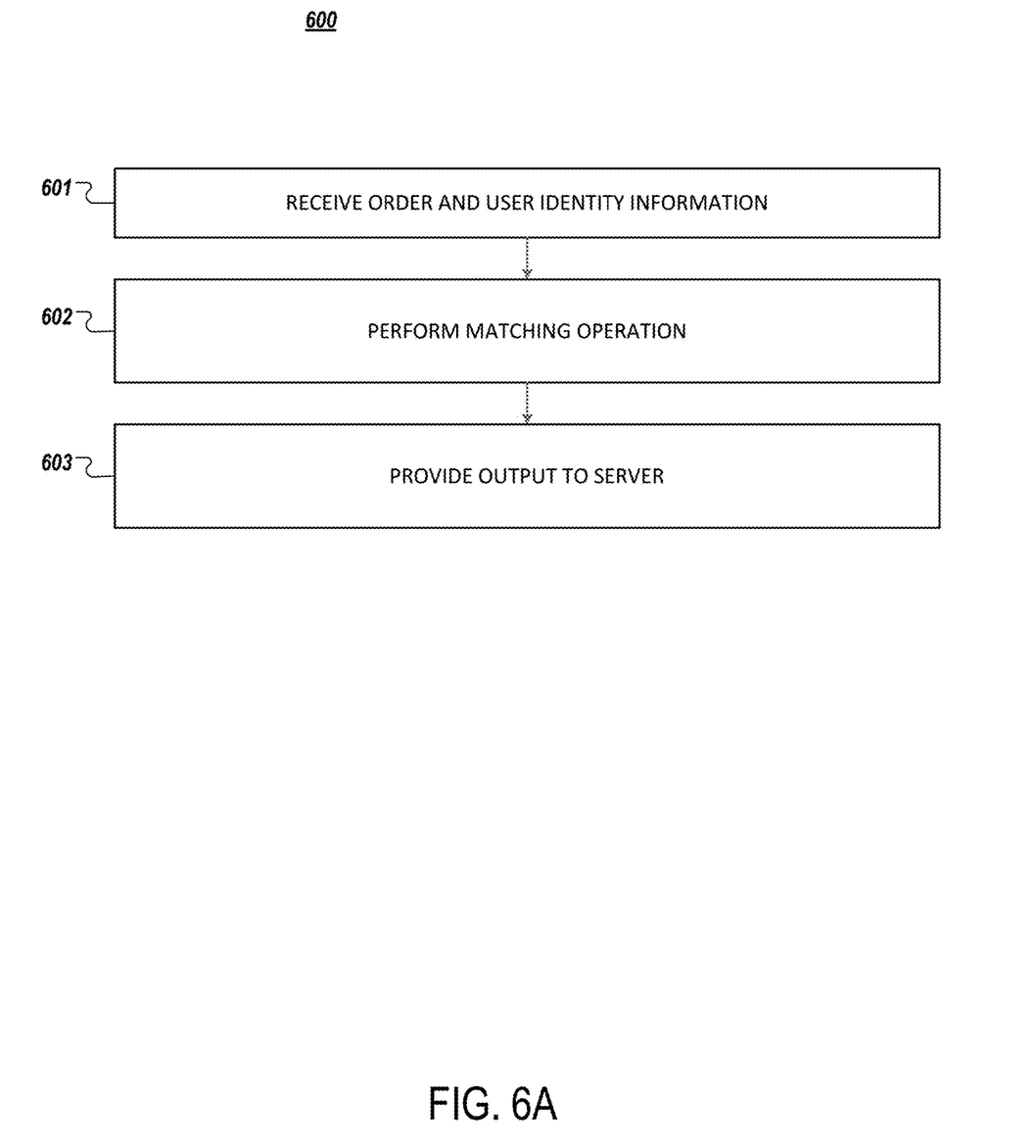
FIGS. 6A and 6B are flowcharts of an example implementation of a method according to the disclosure.
Figure 6B:
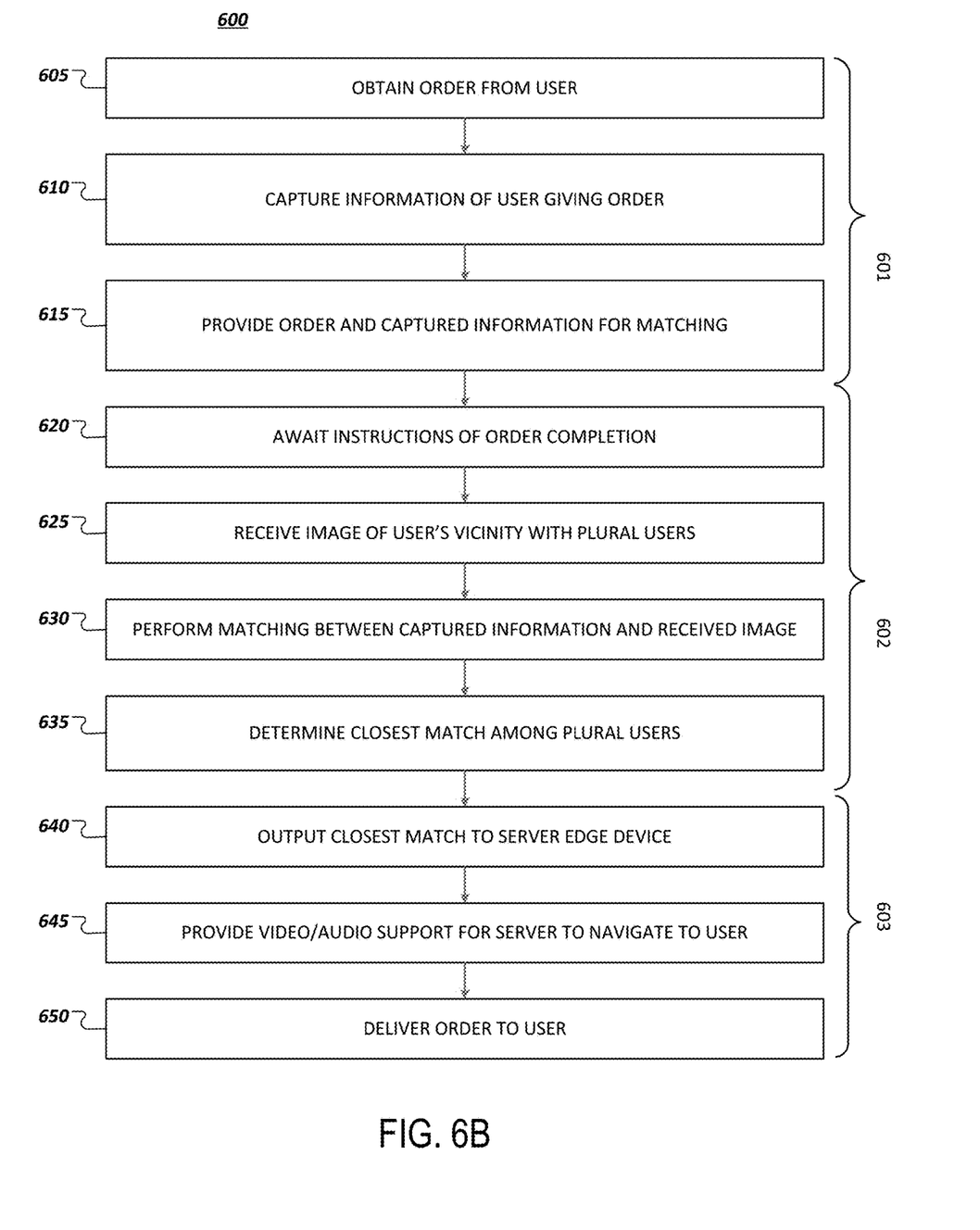

FIGS. 6A and 6B are a flowcharts of an embodiment of a method for according to the disclosure. A method 600 can be implemented by one or more processors in a computing environment (e.g., the computing environment described below). As shown in FIG. 6A, the method 600 can be a combination of multiple sub processes, including at 601, receiving an input associated with the identity and the order placed by the user, such as the dish ordered by the POS and the image captured by the camera. At 602 a matching classification operation is performed once the dish has been prepared. At 603, the server is provided with the video and/or audio support to provide the order to the user. The specific details of the foregoing operations 601-603 are disclosed above and with respect to the description of FIGS. 1-5.

In more detail, FIG. 6B illustrates an example process associated with the present example implementations. While the operations described herein are sequenced according to the drawings, the present plantations are not limited thereto. For example, the sequence of operations may be changed, and operations may be combined, separated or deleted, without departing from the inventive scope.

At 605, an order is obtained from a user. More specifically, the user may be a customer that provides a specific request to order a specific item or service, such as a meal or a dish in a restaurant. The order may be submitted by human interaction, such as personally interacting with a waiter or waitress, who enters the order into a system, either manually or automatically, and either at the time of taking the order or after on paper and later transposing the order into electronic system.

Alternatively, and to provide for sufficient social distancing, the order may be input by the user without human interaction. Examples of order input be performed by user without human interaction include, but are not limited to, on-site POS device at the table of the user, or a counter and receives the order, mobile device of the user connected to a network that allows for submission of the order directly from the user device or other device would be known by skilled art.

At 610, information associated with the user is captured. More specifically, when the user submits the order, either to a server or automatically, an image of the user may be captured by a sensor such as a camera. That image can include information, such as the image itself, locational coordinate information, the order submitted by the user, and any other information as would be understood to be relevant to the identity, location and, and/or the order submitted by the user.

At 615, the captured information and the order submitted by the user are provided for the purpose of matching. More specifically, the information may be submitted, either by cloud, network or local storage, in a manner that can be used by the matching module.

Accordingly, operations 605, 610 and 615 provide the receiving of the order and the associated user information of 601. Further, operations 620-635 refer to the matching operation, as explained below.

At 620, a matching module awaits instructions of the order completion. For example, a user may have his or her image and geolocation information captured in advance of taking the order or after taking the order. However, until the order is finalized, the matching function of the matching module is not performed. At 620, either by an automatic process of the matching module determining that both the order and the image have been provided, or optionally the server or enterprise such as restaurant approving or validating the order, the matching operations are invoked. Further, a second instruction may be provided, indicating that the order is ready for delivery, such as a message from the kitchen, server, or other entity that may be able to provide an indication that the server requires support to navigate the order to the user.

At 625, an image of the user's vicinity is received, including the surrounding users, tables, etc. Thus, the camera image is intended to provide the matching module with a view of how a server might see the service area from the location where he or she receives the order to be delivered. Accordingly plural users, including the user that submitted the order, will be present in the image that is received.

At 630, a matching operation is performed between the captured image of the user that submitted the order, and he received image of the user's vicinity. Further details of the matching operation are disclosed above and explained, also in reference to FIGS. 4 and 5.

Once the matching operation has been performed, at 635 closest match between the image information of the user viewing the order and the plural users in the image of the user's sanity, is determined.

Accordingly, at operations 620-635, the matching operation is performed. As explained below, the providing of the output to the server, to assist the server delivering the order, is explained with respect to operations 640-650.

At 640, the matching module generates an output that is provided to an edge device used by the server. For example not by way of limitation, the edge device may be a POS device, mobile phone, a headset worn by user, or other edge device as would be understood by those skilled in the art as being used by a server.

At 645, the server is provided with support to navigate to the user. Example but not by way of limitation, and also as disclosed above, a video output that identifies the closest match as determined by the matching module may be provided, with the user being highlighted to distinguish from other users. Additionally, or alternatively, audio support that provides server with some directional support on how to navigate to the position of the user who placed the order may also be provided.

At 650, the order is delivered to the user.

Figure 7:
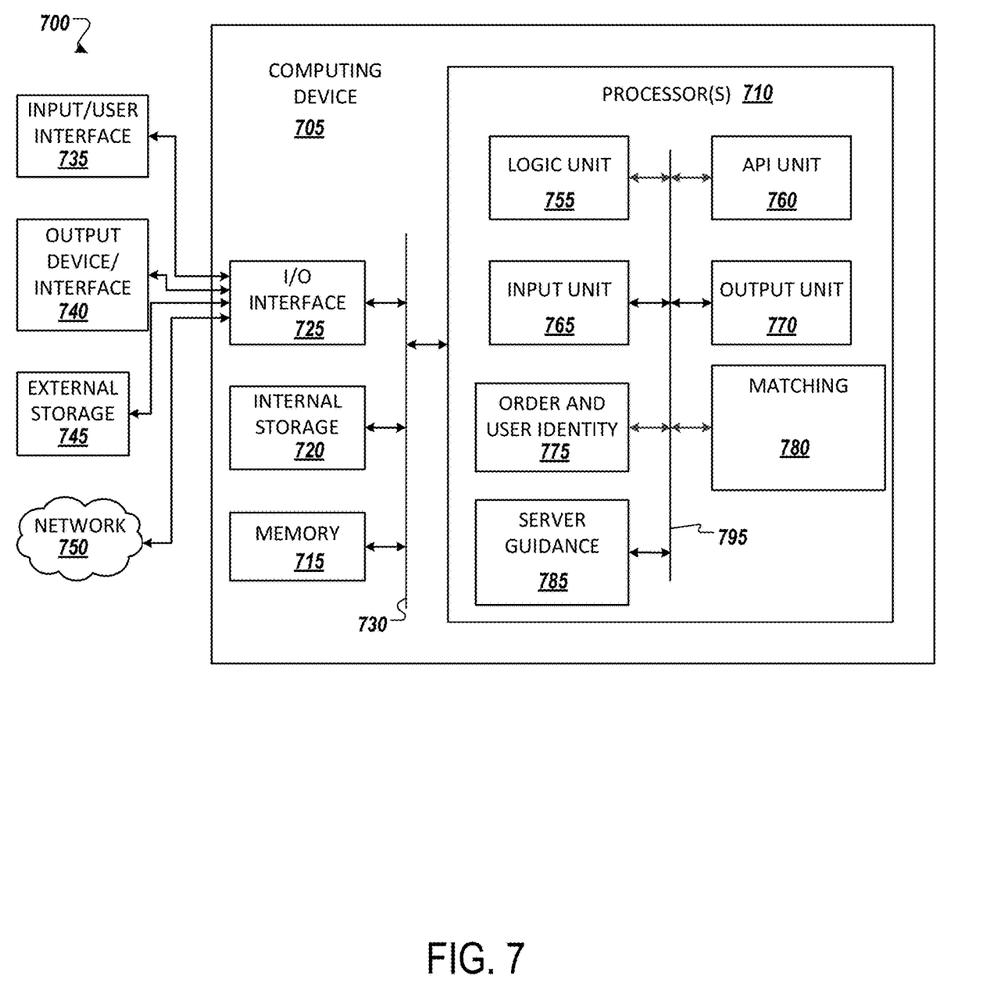
FIG. 7 is a functional block diagram of an example implementation of a computing environment according to the disclosure.

FIG. 7 is a functional block diagram of an embodiment of a computing environment according to the disclosure. A computing environment 700 with an example computer device 705 suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705. The environment 700 can support operations associated with the system 100, for example.

According to the present example implementations, the processing associated with the neural activity may occur on a processor 710 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 705 can be communicatively coupled to input/interface 735 and output device/interface 740. Either one or both of input/interface 735 and output device/interface 740 can be a wired or wireless interface and can be detachable. Input/interface 735 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 740 may include a display, television, monitor, printer, speaker, braille, or the like. In some example implementations, input/interface 735 (e.g., user interface) and output device/interface 740 can be embedded with, or physically coupled to, the computing device 705. In other example implementations, other computing devices may function as, or provide the functions of, an input/interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as, a server, client, thin server, general machine, special-purpose machine, or another label. For example but not by way of limitation, network 750 may include the blockchain network, and/or the cloud.

I/O interface 725 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, order and user identity unit 775, matching unit 780, server guidance unit 785, and inter-unit communication mechanism 795 for the different units (e.g., the encode 110 and the decoder 120) to communicate with each other, with the OS, and with other applications (not shown).

The order and user identity unit 775 can perform functions associated with receiving inputs, processing inputs, and determining a classification of the visitor. The matching unit 780 can perform functions associated with the detection of the object being delivered. The server guidance unit 785 can perform functions associated with the receiving input such as speech from the visitor, and providing the resident with an opportunity to provide an output to the visitor.

For example, the order and user identity unit 775, the matching unit 780, and the server guidance unit 785 may implement one or more processes shown above with respect to the structures described above in addition to the method 300 and the method 400. The described units and elements can be varied in design, function, configuration, or implementation and are not limited to the descriptions provided.

In some example implementations, when information or an execution instruction is received by API unit 760, it may be communicated to one or more other units (e.g., logic unit 755, input unit 765, order and user identity unit 775, matching unit 780, and server guidance unit 785).

In some instances, the logic unit 755 may be configured to control the information flow among the units and direct the services provided by API unit 760, input unit 765, order and user identity unit 775, matching unit 780, and server guidance unit 785 in some example implementations described above. For example, the flow of one or more processes or implementations may be controlled by logic unit 755 alone or in conjunction with API unit 760.

Figure 8:
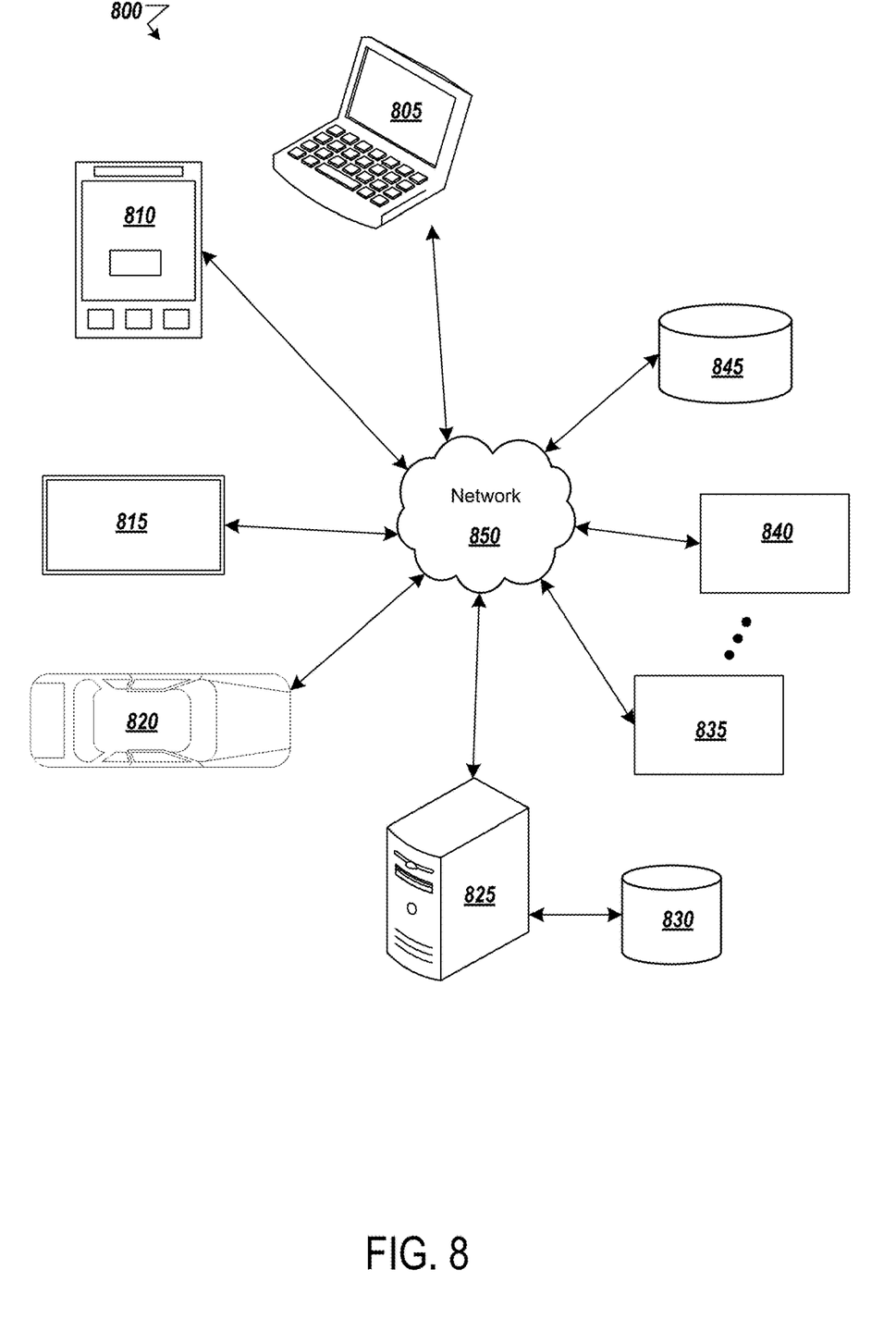
FIG. 8 is a functional block diagram of an exemplary operating environment according to the disclosure.

FIG. 8 is a functional block diagram of an exemplary operating environment according to the disclosure. An environment 800 can be suitable for some example implementations disclosed herein. Environment 800 includes devices 805-845, and each is communicatively connected to at least one other device via, for example, network 860 (e.g., by wired and/or wireless connections). Some devices may be communicatively connected to one or more storage devices 830 and 845.

An example of one or more devices 805-845 may be computing devices 705 described in FIG. 7, respectively. Devices 805-845 may include, but are not limited to, a computer 805 (e.g., a laptop computing device) having a monitor and an associated webcam as explained above, a mobile device 810 (e.g., smartphone or tablet), a television 815, a device associated with a vehicle 820, a server computer 825, computing devices 835-840, storage devices 830 and 845.

In some implementations, devices 805-820 may be considered user devices associated with the users, who may be remotely obtaining a sensed audio input used as inputs for the foregoing example implementations. In the present example implementations, one or more of these user devices 805-820 may be associated with one or more sensors such as microphones in a phone of a user or a POS device, that can sense information as needed for the present example implementations, as explained above.

The example implementations may have various benefits and advantages. For example, but not by way of limitation, by using the approaches disclosed above and in FIGS. 1-5, accuracy may be substantially approved, particularly with the fusing approach. The accuracies can achieve over 90%, and fusing normalized features may improve accuracy as well as mAP. As a result, the error of the server in order delivery may be reduced.

The present example implementations may also supplement the existing related art POS approaches. As explained above, the related art POS approaches provide for menu management or bill splitting, etc. However, the related art POS does not assist the server to accurately deliver the order. Further, and also in contrast to related art approaches of matching, the present example implementations provide artificial intelligence, including the application of normalized feature spaces for training, and attentive fusion for testing, for CNNs.

Additionally, the POS device may be integrated with a mobile device of the user in the restaurant, such that the account of the user is also associated with the order. As a result, the user may be individually billed without difficulty for the party including the user to perform calculations, and also while allowing the user to have points or the like credited to her or her account with the restaurant, or share with others on the order, without requiring the server to make manual adjustments to the bill. Optionally, the user may be provided with an ordering suggestion based on the account of the user and historical ordering information or preferences.

Further, the example implementation can account for situations unique to a restaurant. When a user moves a seat or table, the user may be difficult for the server to later locate for order determination. Because the present example implementation may search the entire region of the restaurant where the user may be located, it is possible to find and deliver the order correctly to the user.

In restaurants where the user orders at a counter and then is later seated (e.g., numbering system), it may be possible for the server to deliver the order without having to look for the number of the table, and without having to ask the user to inform his order. Thus, the server can increase speed and accuracy.

This feature is particularly useful where the differences in order between parties is minute (e.g., same main dish with different spices or toppings), or very crucial (e.g., allergy-free, gluten free, etc.). Thus, the restaurant may avoid risks of food contamination or customer illness.

With respect to online customer reviews, the present example implementation may also provide benefits and advantages. For example but not by way of limitation, for an online review, the reviewer may be validated against the dish actually delivered, to confirm a customer complaint or feedback, and to avoid false or misleading reviews. Thus, the restaurant may be able to provide for better quality control.

Similarly, because the camera is providing inputs continuously, the camera may also provide some indication of satisfaction after the delivery of the order. For example but not by way of limitation, a reaction of the user may be determined to be positive or negative, either in real-time or later, in a manner that permits the server to provide feedback and possibly correct any service related issue.

With respect to the location of the camera, although it is indicated to be in the facility (e.g., table, ceiling, etc.), the present example implementations are not limited thereto. For example, but not by way of limitation, the camera may be positioned on a wearable device of the server (e.g., glasses, cap, clothing, etc.), such that the view of the server is matched with the view processed by the matching module. Optionally, the camera may be integrated with augmented reality, virtual reality, and/or mixed reality. Further optionally, the server may wear a badge and carry a POS device, tablet, etc. In addition to the use of sensors such as a camera, an audio sensor, such as a microphone may be used. To the extent that other locational tools such as Bluetooth, Wi-Fi, or RF associated with the mobile device of the user, and their account or identity, may be used to assist in the location and identity determination. Optionally, a server may have an electronic device and users may have electronic devices, all linked by common communication protocol such as Bluetooth. The user may capture an image and then associate the image with the common devices (e.g., use of Bluetooth ID). Further association may be made to the points account or the business account associated with the device of the user.

With respect to retail and restaurant queuing systems and configurations, the present example implementation may be provided to increase accuracy of delivery. For example, but not by way of limitation, for curbside pickup in retail, or in-store pickup with social distancing between persons waiting in a queue, it may be possible to more accurately match a product to be delivered to the user ordering the product. As a result, the server may have less risk of unnecessary close contact between extra persons what would occur in the case of mis-delivery of the order to the wrong person. Similarly, the user also bears less risk of receiving the incorrect product, or unnecessary close interaction with multiple servers.

The face identification can be used to replace the use of tickets or tokens to match objects with users. Such an approach may also be used in multi-queue drive-through services, such as fast food, where the server must distinguish between cars in multiple queues; the security camera video may be employed to obtain the initial user image capture.

The foregoing example implementations may also be applied to other environments, such as airport baggage claim. Thus, social distancing may be observed in the airport by associating a sequence of luggage with a sequence of travelers awaiting receipt of their luggage, in the manner explained above.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method, comprising:
    receiving an order associated with a user, and capturing information associated with a physical attribute of the user using a portable device;
    for the order being completed, receiving an information capturing request of a region of the user, and capturing, using the portable device, information associated with the region of the user;
    performing a matching operation on the captured information associated with the physical attribute of the user and the captured information associated with the region of the user to determine a closest match based on the physical attribute of the user, wherein the information associated with the region of the user includes the physical attribute of the user and respective physical attributes of other users; and
    generating an output that identifies the user associated with the closest match in the information associated with the region of the user, and providing the output to a server to deliver the order to the user, wherein the output comprises at least an image that identifies the user amongst the other users.

2. The computer-implemented method of claim 1, wherein the matching operation comprises:
    defining the captured information associated with the physical attribute of the user as a first input, and the information associated with the region of the user as a second input;
    applying the first input and the second input to a convolutional neural network, to generate a prediction of a closest match between the physical attribute of the user in the first input and the physical attribute of the user and the physical attributes of the other users in the second input;
    associating the prediction with an indicator in the region of the user; and
    generating an output as a visual and/or audio label, for use in an edge device associated with the server.

3. The computer-implemented method of claim 2, wherein the convolutional neural network comprises a feature space integrated with spaces for which batch normalization, similarity loss and attentive fusion have been performed.

4. The computer-implemented method of claim 1, wherein the receiving the order associated with the user comprises providing the user with a plurality of options in a user interface, such that the user selects an option that is transmitted by network communication to a processor that performs the matching, and the information associated with the physical attribute of the user comprises capturing an image of the user and locational information of the user.

5. The computer-implemented method of claim 1, wherein the providing the output to the server to deliver the order comprises at least one of providing an image of the region in which the user is located, which identifies the user amongst the other users, or providing the server with one or more audio signals that allow the user to physically move the order from a current location to a position of the user.

6. The computer-implemented method of claim 1, wherein the user comprises a customer in a restaurant, the order comprises a selection from a menu of the restaurant, and the server comprises a human or automated delivery machine that takes the order, after completion and the providing of the output, to the customer, amongst the other users that comprise other customers located in the restaurant.

7. The computer-implemented method of claim 1, wherein the physical attribute of the user is captured by one or more cameras positioned in the region of the user, or on the server processing the order.

8. A non-transitory computer readable medium including instructions executable on a processor, the instructions comprising:
    receiving an order associated with a user, and capturing information associated with a physical attribute of the user using a portable device;
    for the order being completed, receiving an information capturing request of a region of the user, and capturing, using the portable device, information associated with the region of the user;
    performing a matching operation on the captured information associated with the physical attribute of the user and the captured information associated with the region of the user to determine a closest match based on the physical attribute of the user, wherein the information associated with the region of the user includes the physical attribute of the user and respective physical attributes of other users; and
    generating an output that identifies the user associated with the closest match in the information associated with the region of the user, wherein the output comprises at least an image that identifies the user amongst the other users, and providing the output to a server to deliver the order to the user.

9. The non-transitory computer readable medium of claim 8, wherein the matching operation comprises:
    defining the captured information associated with the physical attribute of the user as a first input, and the information associated with the region of the user as a second input;
    applying the first input and the second input to a convolutional neural network, to generate a prediction of a closest match between the physical attribute of the user in the first input and the physical attribute of the user and the physical attributes of the other users in the second input;
    associating the prediction with an indicator in the region of the user; and
    generating an output as a visual and/or audio label, for use in an edge device associated with the server.

10. The non-transitory computer readable medium of claim 9, wherein the convolutional neural network comprises a feature space integrated with spaces for which batch normalization, similarity loss and attentive fusion have been performed.

11. The non-transitory computer readable medium of claim 8, wherein the receiving the order associated with the user comprises providing the user with a plurality of options in a user interface, such that the user selects an option that is transmitted by network communication to a processor that performs the matching, and the information associated with the physical attribute of the user comprises capturing an image of the user and locational information of the user.

12. The non-transitory computer readable medium of claim 8, wherein the providing the output to the server to deliver the order comprises at least one of providing an image of the region in which the user is located, which identifies the user amongst the other users, or providing the server with one or more audio signals that allow the user to physically move the order from a current location to a position of the user.

13. The non-transitory computer readable medium of claim 8, wherein the user comprises a customer in a restaurant, the order comprises a selection from a menu of the restaurant, and the server comprises a human or automated delivery machine that takes the order, after completion and the providing of the output, to the customer, amongst the other users that comprise other customers located in the restaurant.

14. The non-transitory computer readable medium of claim 8, wherein the physical attribute of the user is captured by one or more cameras positioned in the region of the user, or on the server processing the order.

15. A system, comprising:
an input device that receives an order associated with a user;
a sensor that captures information associated with a physical attribute of the user, wherein the sensor is located on a portable device;
a processor, which, for the order being completed, configured to receive an information capturing request of a region of the user, and captures, using the sensor, information associated with the region of the user;
the processor is configured to perform matching on the captured information associated with the physical attribute of the user and the captured information associated with the region of the user to determine a closest match based on the physical attribute of the user, wherein the information associated with the region of the user includes the physical attribute of the user and respective physical attributes of other users, and
the processor is configured to generate an output that identifies the user associated with the closest match in the information associated with the region of the user, wherein the output comprises at least an image that identifies the user amongst the other users; and
a server device that receives the output and provides the output to the server to deliver the order to the user.

16. The system of claim 15, wherein the matching comprises defining the captured information associated with the physical attribute of the user as a first input, and the information associated with the region of the user as a second input, applying the first input and the second input to a convolutional neural network, to generate a prediction of a closest match between the physical attribute of the user in the first input and the physical attribute of the user and the physical attributes of the other users in the second input, associating the prediction with an indicator in the region of the user, and generating an output as a visual and/or audio label, for use in an edge device associated with the server, wherein the convolutional neural network comprises a feature space integrated with spaces for which batch normalization, similarity loss and attentive fusion have been performed.

17. The system of claim 15, wherein the input device provides the user with a plurality of options in a user interface, such that the user selects an option that is transmitted by network communication to a processor that performs the matching, and the sensor comprises a camera that captures an image of the user and locational information of the user.

18. The system of claim 15, wherein the server device displays an image of the region in which the user is located, which identifies the user amongst the other users, or provides the server with one or more audio signals that allow the user to physically move the order from a current location to a position of the user.

19. The system of claim 15, wherein the user comprises a customer in a restaurant, the order comprises a selection from a menu of the restaurant, and the server comprises a human or automated delivery machine that takes the order, after completion and the providing of the output, to the customer, amongst the other users that comprise other customers located in the restaurant.

20. The server of claim 15, wherein the physical attribute of the user is captured by one or more cameras positioned in the region of the user, or on the server processing the order.

* * * * *